(12) United States Patent
Yang (10) Patent No.: US 9,855,828 B1
(45) Date of Patent: Jan. 2, 2018

(54) TONNEAU COVER (71) Applicant: TAYIH LUN AN CO., LTD., Tainan (TW)

(72) Inventor: Chih-Yuan Yang, Tainan (TW)

(73) Assignee: TAYIH KENMOS AUTO PARTS CO., LTD., Southern Taiwan Science Park, Tainan (TW)

( * ) Notice: Subject to any disclaimer, the term of this patent is extended or adjusted under 35 U.S.C. 154(b) by 0 days.

(21) Appl. No.: 15/342,126

(22) Filed: Nov. 3, 2016

(51) Int. Cl.
*B60J 7/14* (2006.01)

(52) U.S. Cl.
CPC .................................... *B60J 7/141* (2013.01)

(58) Field of Classification Search
CPC . B60J 7/16; B60J 7/1607; B60J 7/1621; B60J 7/022; B60J 7/041; B60J 7/047; B60J 7/141; B60J 7/19; B60J 7/198
USPC ............ 296/100.02, 100.03, 100.04, 100.06, 296/100.07, 100.09
See application file for complete search history.

(56) References Cited

U.S. PATENT DOCUMENTS

| 3,649,072 | A | * | 3/1972 | Cross | B60J 7/041 296/100.03 |
| 4,210,361 | A | * | 7/1980 | Marvin | B60J 7/068 296/100.03 |
| 4,741,570 | A | * | 5/1988 | Lovaas | B60J 7/041 296/100.04 |
| 4,776,629 | A | * | 10/1988 | Cross | B60J 7/041 160/32 |
| 5,636,893 | A | * | 6/1997 | Wheatley | B60J 7/141 16/354 |
| 6,095,588 | A | * | 8/2000 | Rodosta | B60J 7/141 296/100.09 |
| 6,224,138 | B1 | * | 5/2001 | Adsit | B60J 7/041 224/404 |
| 6,296,302 | B1 | * | 10/2001 | Martinus Lenkens | B60J 7/047 296/220.01 |
| 6,827,389 | B1 | * | 12/2004 | Pandorf | B60J 7/141 296/100.02 |
| 6,908,139 | B1 | * | 6/2005 | Szieff | B60J 7/141 296/100.03 |
| 7,384,089 | B1 | * | 6/2008 | Ablang | B60J 7/141 296/100.08 |

(Continued)

FOREIGN PATENT DOCUMENTS

| DE | 4415649 C1 | * | 6/1995 | ............. B60J 7/047 |
| DE | 19856873 C1 | * | 2/2000 | ............. B60J 7/047 |

(Continued)

OTHER PUBLICATIONS

Definition of lever accessed Sep. 9, 2017; http://www.bing.com/search?q=define+lever&src=IE-SearchBox&FORM=IESR02.*

*Primary Examiner* — Hilary L Gutman (57) ABSTRACT

A tonneau cover generally includes two rails and at least two plates. The two rails are adapted to be fixedly mounted at two lateral sides of a cargo bed of a truck. A first plate is fixed to the two rails. A second plate is pivotally connected to the first plate and other plates are pivotally connected one after another in the same manner. In operation, all the plates except the first plate can be operated to move along the two rails to allow the plates to overlap each other to uncover the cargo bed of the truck, or to allow the plates to be flush with each other to cover the cargo bed of the truck. The tonneau cover occupies less space and can be operated easily and conveniently.

8 Claims, 13 Drawing Sheets

(56) References Cited

U.S. PATENT DOCUMENTS

| | | | | |
|---|---|---|---|---|
| 9,399,391 | B2 * | 7/2016 | Bernardo | B60J 7/085 |
| 2001/0035664 | A1 * | 11/2001 | Steffens | B60J 7/141 |
| | | | | 296/100.09 |
| 2003/0085596 | A1 * | 5/2003 | Messerschmidt | B60J 7/047 |
| | | | | 296/220.01 |
| 2005/0099033 | A1 * | 5/2005 | Chverchko | B60J 7/1621 |
| | | | | 296/100.09 |
| 2008/0100088 | A1 * | 5/2008 | Calder | B60J 7/141 |
| | | | | 296/100.09 |
| 2013/0093206 | A1 * | 4/2013 | Rusher | B60P 7/02 |
| | | | | 296/100.14 |
| 2014/0152046 | A1 * | 6/2014 | Facchinello | B60J 7/141 |
| | | | | 296/100.06 |
| 2016/0200376 | A1 * | 7/2016 | Kerr | B60P 7/02 |
| | | | | 296/100.07 |

FOREIGN PATENT DOCUMENTS

| | | | | | |
|---|---|---|---|---|---|
| DE | 19927654 | C1 | * | 7/2000 | B60J 7/047 |
| FR | 2993510 | A1 | * | 1/2014 | B60J 7/1621 |
| GB | 2205282 | A | * | 12/1988 | B60J 7/041 |
| JP | 2000052774 | A | * | 2/2000 | B60J 7/047 |
| NL | 1006925 | C2 | * | 3/1999 | B60J 7/047 |

\* cited by examiner

TONNEAU COVER

BACKGROUND OF THE INVENTION

1. Field of the Invention

The present invention relates to a tonneau cover, and more particularly, to a tonneau cover that includes one or more movable plates, which can slide horizontally to facilitate operation of the tonneau cover.

2. Description of the Prior Art

Figure 1:
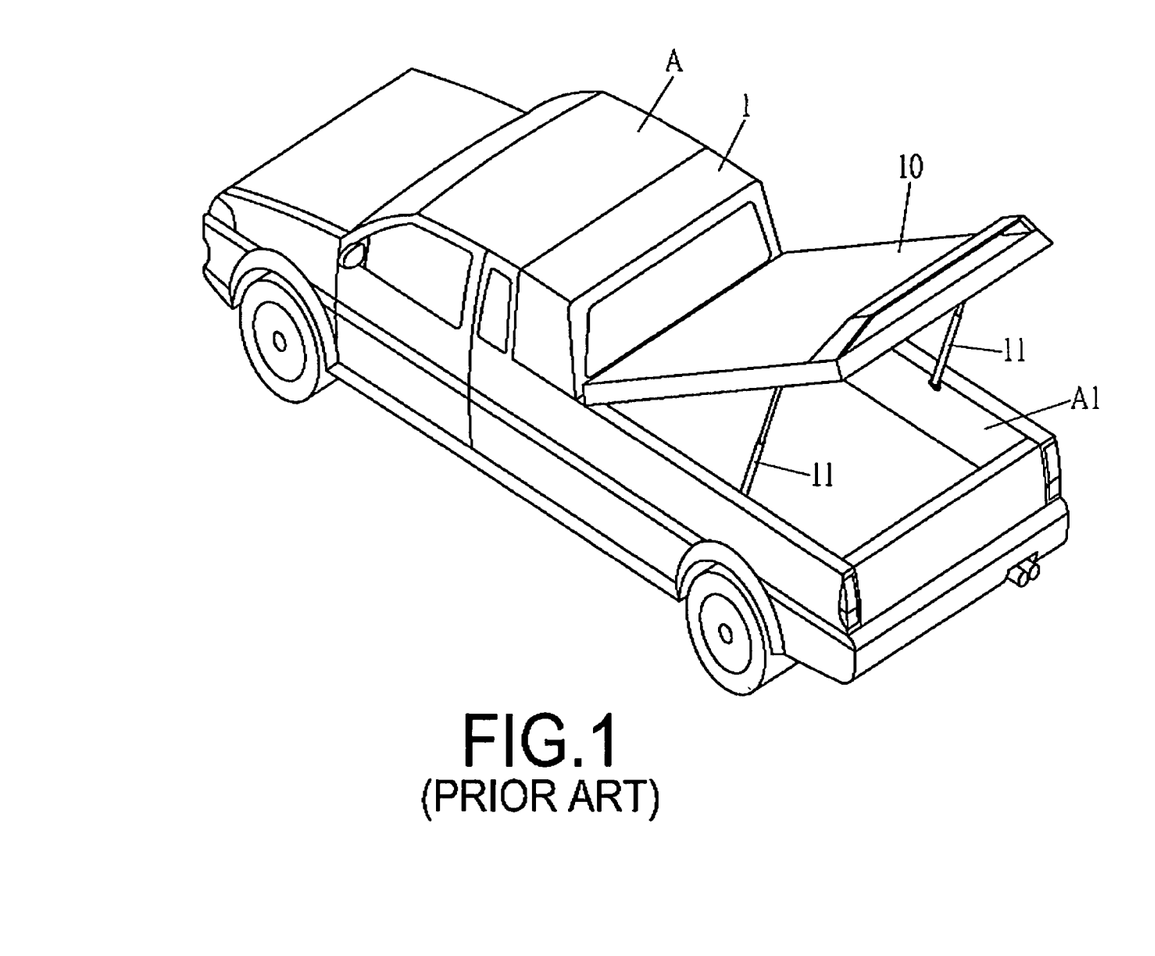
FIG. 1 shows that a conventional tonneau cover is opened.
Figure 2:
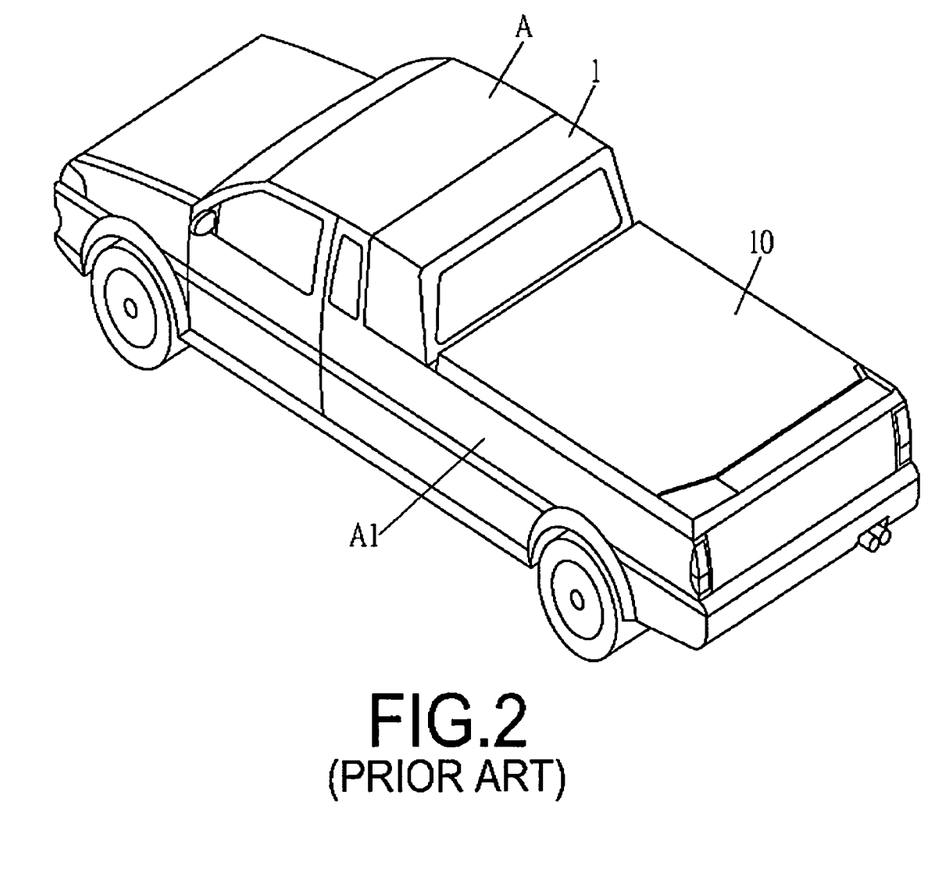
FIG. 2 shows that the conventional tonneau cover is closed.
Figure 3:
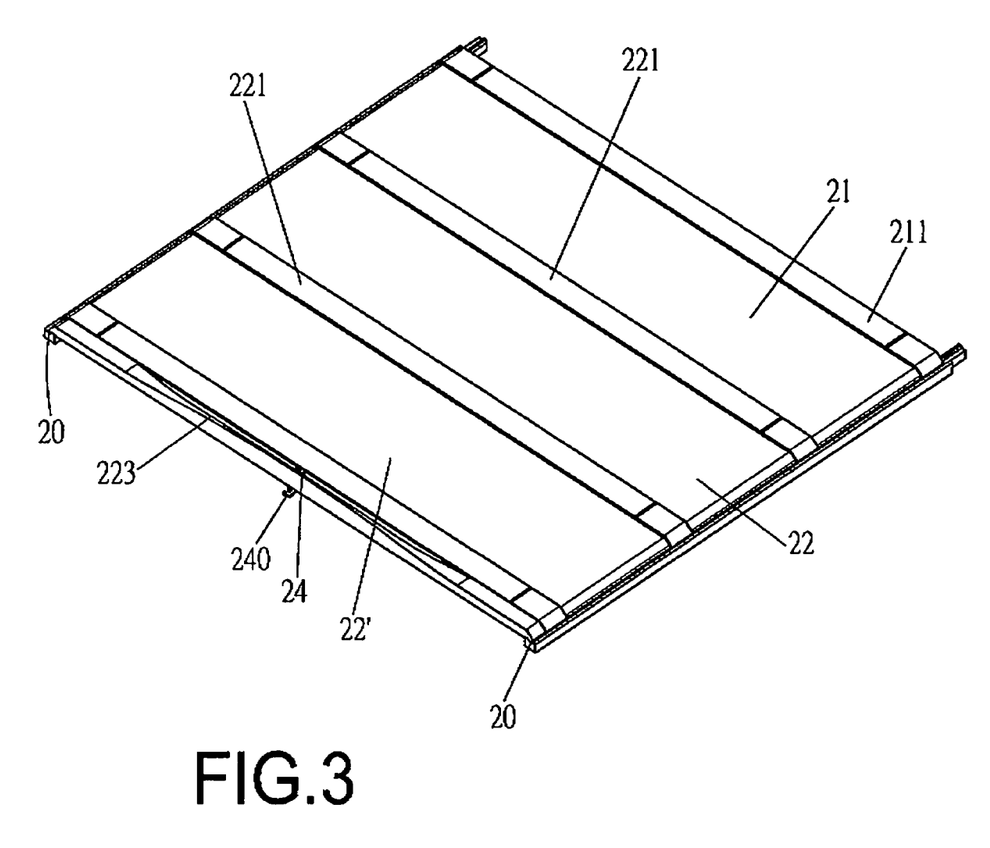
FIG. 3 is a perspective view of a tonneau cover according to one embodiment of the present invention.
Figure 4:
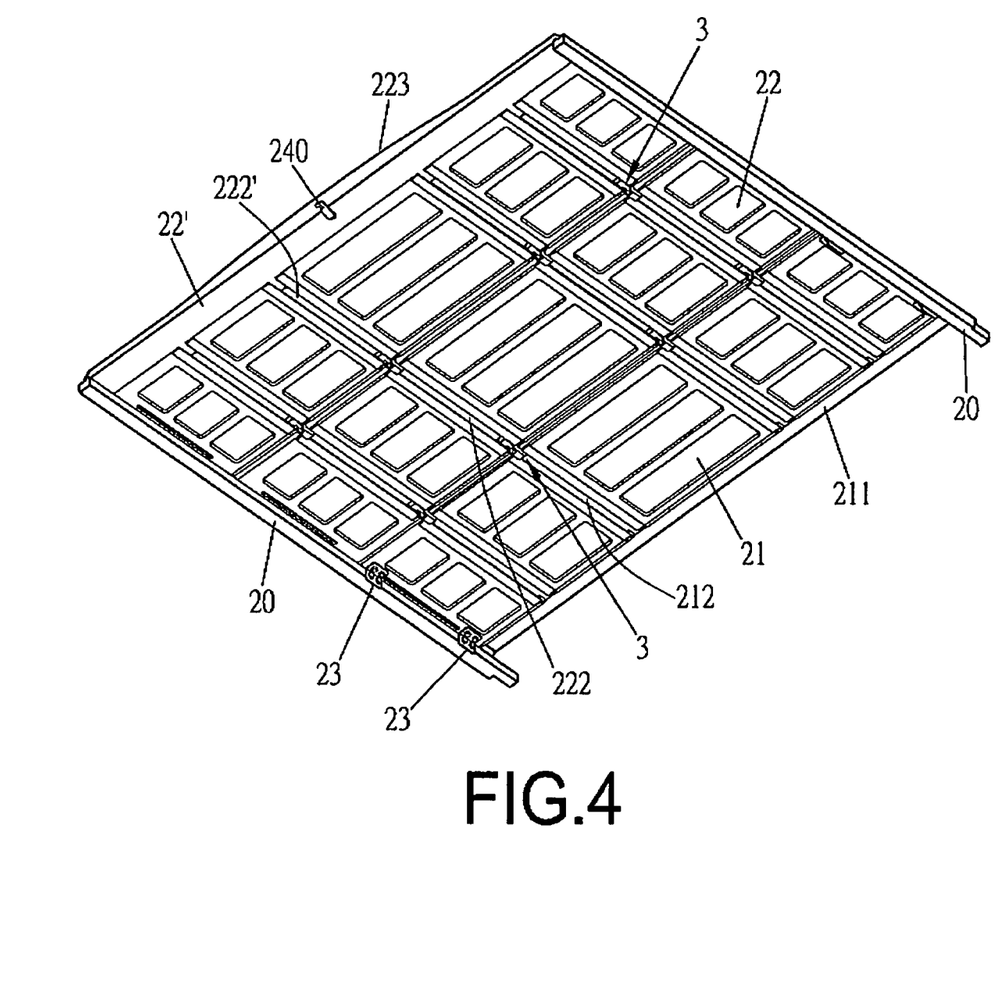
FIG. 4 is another perspective view of the tonneau cover.
Figure 5:
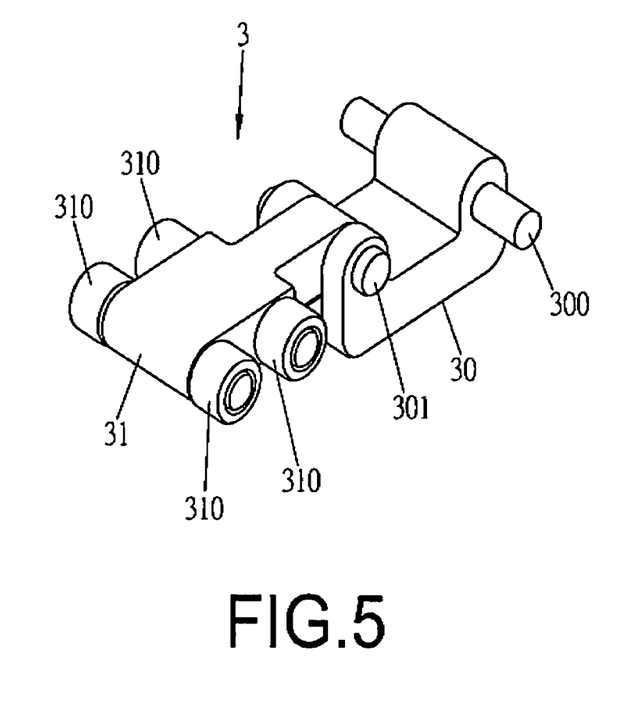
FIG. 5 is a perspective view of a pivotal device used in the tonneau cover.
Figure 6:
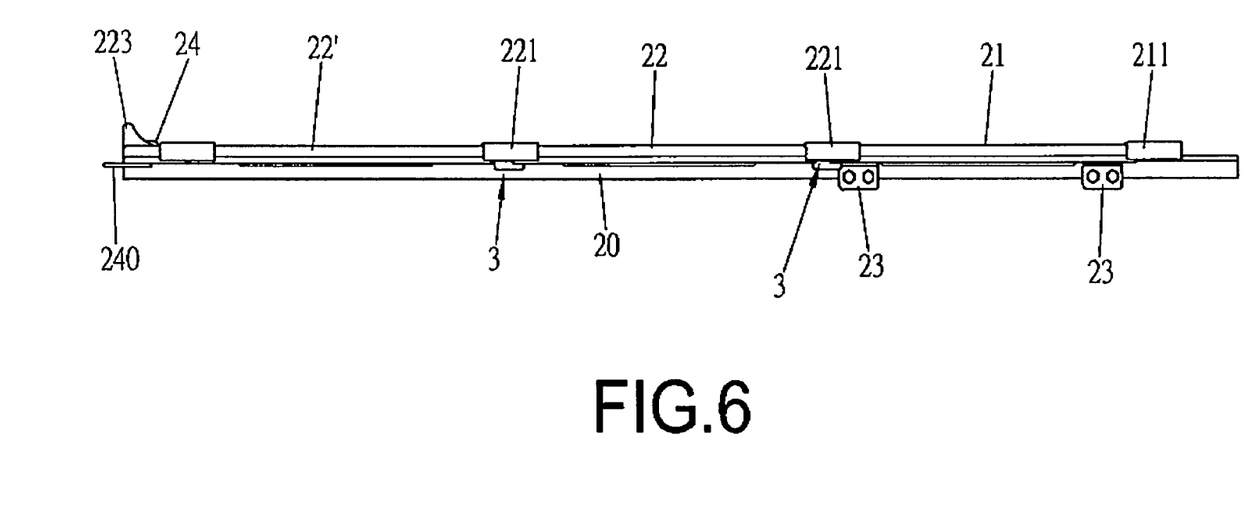
FIG. 6 is a side plan view of the tonneau cover which is completely extended.

A typical truck includes a cabin for drivers and passengers, and an open cargo bed. The open cargo bed is designed for accommodating goods. However, the goods on the cargo bed are exposed to the outside environment and can cause turbulence easily while the truck is moving. The goods are also exposed to rain and dust. As shown in FIGS. 1 and 2, a conventional tonneau cover 10 for covering an open cargo bed (A1) of a truck (A) is shown. The conventional tonneau cover 10 includes two hydraulic cylinders 11 which are operated to lift the rear end of the tonneau cover 10 and maintain an angle of the tonneau cover 10 so that the users can pick goods out from the cargo bed (A1). However, due to the limitation of the length of the hydraulic cylinders 11, the tonneau cover 10 can only be raised to 35 degrees relative to the cargo bed (A1). The tonneau cover 10 cannot be raised to an upright position so that it is not suitable for large goods to be taken out from the open cargo bed (A1).

The present invention intends to provide a tonneau cover that includes one or more movable plates which can slide horizontally to facilitate operation of the tonneau cover and eliminate the shortcomings mentioned above.

SUMMARY OF THE INVENTION

One object of the present invention is to provide a tonneau cover, which occupies less space and can be operated more easily and conveniently.

The tonneau cover generally comprises two rails and at least two plates. The two rails are adapted to be fixedly mounted at two lateral sides of a cargo bed of a truck. A first plate is fixed to the two rails. A second plate is pivotally connected to the first plate, and other plates are pivotally connected one after another in the same manner. In operation, all the plates except the first plate can be operated to move along the two rails to allow the plates to overlap each other to uncover the cargo bed of the truck, or to allow the plates to be flush with each other to cover the cargo bed of the truck.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 7:
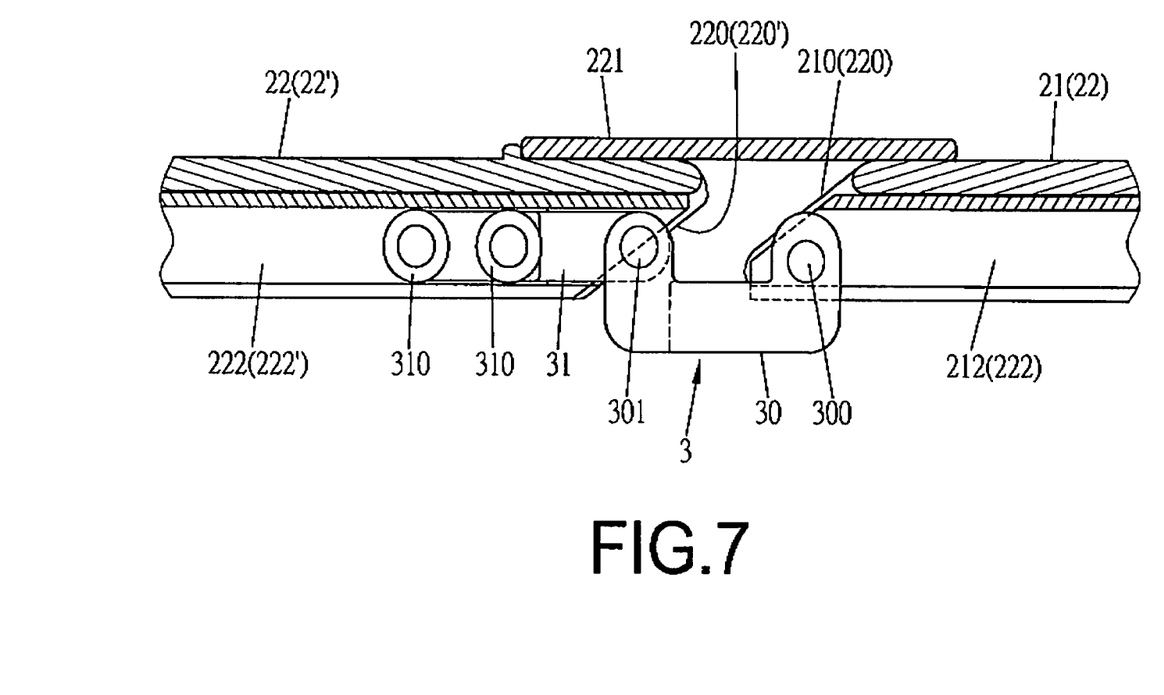
FIG. 7 is an enlarged cross sectional view of the pivotal device when the tonneau cover is extended.
Figure 8:
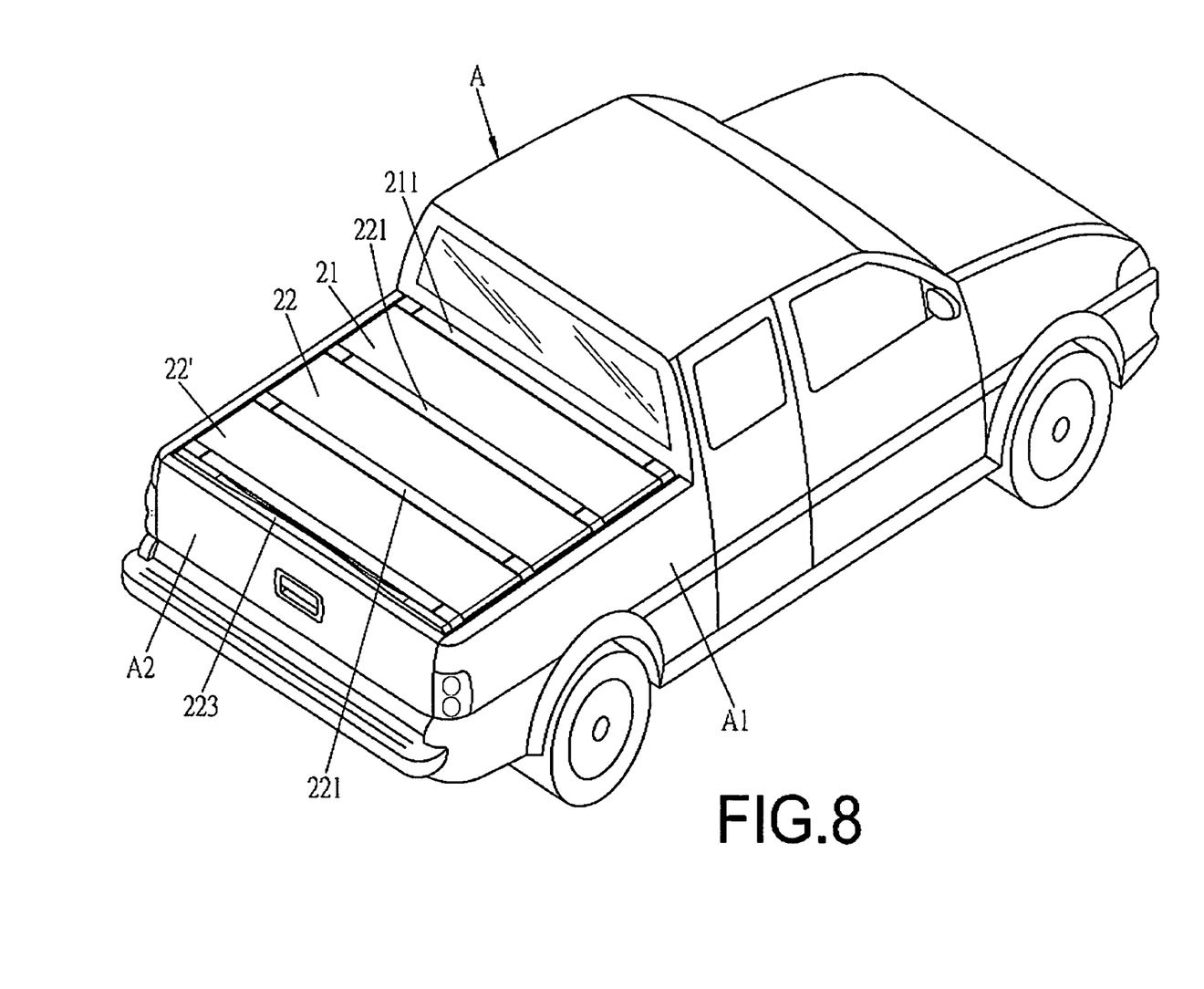
FIG. 8 is a perspective view of the tonneau cover installed at a truck and extended to cover the cargo bed of the truck.

Referring to FIGS. 3 through 9, a tonneau cover according to one embodiment of the present generally comprises two rails 20, a first plate 21, a second plate 22, and a third plate 22'. The two rails 20 are adapted to be fixedly mounted at two lateral sides of a cargo bed (A1) of a truck (A). The first plate 21, which has a front side, a rear side, and two lateral sides, is fixed to the two rails 20 by connection members 23 which join the two lateral sides with the two rails 20. The first plate 21 defines at least one groove 212 at its undersurface. The second plate 22 has a front side and a rear side and defines at least one groove 222 at its undersurface. The third plate 22' has a front side and a rear side and defines at least one groove 222' at its undersurface. The second plate 22 is coupled to the first plate 21 by at least one pivotal device 3. Similarly, the third plate 22' is coupled to the second plate 22 by at least one pivotal device 3. Each of the pivotal devices 3 includes a first link 30 and a second link 31 provided with rollers 310 and pivotally connected at a first pivot 301 to the first link 30. Specifically, the first link 30 is a U-shaped member, one end of which is provided with the first pivot 301 for connecting with the second link 31, and the other end of which is provided with a second pivot 300. For the pivotal device connected between the first and second plates 21, 22, as shown in FIG. 7, the first link 30 is connected at the second pivot 300 to the rear side of the first plate 21, while the rollers 310 of the second link 31 are located in the groove 222 of the second plate 22. For the pivotal device 3 connected between the second and third plates 22, 22', as shown in FIG. 7, the first link 30 is connected at the second pivot 300 to the rear side of the second plate 22, while the rollers 310 of the second link 31 are located in the groove 222' of the third plate 22'. Preferably, the first plate 21 is formed with an inclined face 210 at its rear side (see FIG. 7), the second plate 22 is formed with two inclined faces 220 respectively at its front and rear sides, and the third plate 22' is formed with an inclined face 222' at its front side. In this embodiment, the rear side of the third plate 22' can be provided with a protrusion 223 to facilitate operation of the tonneau cover, and provided with a lock 24 including a hook 240 to enable the third plate 22' to be attached to the tailgate (A2) of the cargo bed (A1) of the truck (A). In addition, one decorative plate 211 can be provided at the front side of the first plate 21; and one decorative plate 221 can be provided between the first and second plates 21, 22 to cover a gap therebetween when the second plate 22 is flush with the first plate 21 (see FIG. 7); similarly, another decorative plate 221 can be provided between the second and third plate 22, 22' to cover a gap therebetween when the third plate 22' is flush with the second plate 22.

Figure 9:
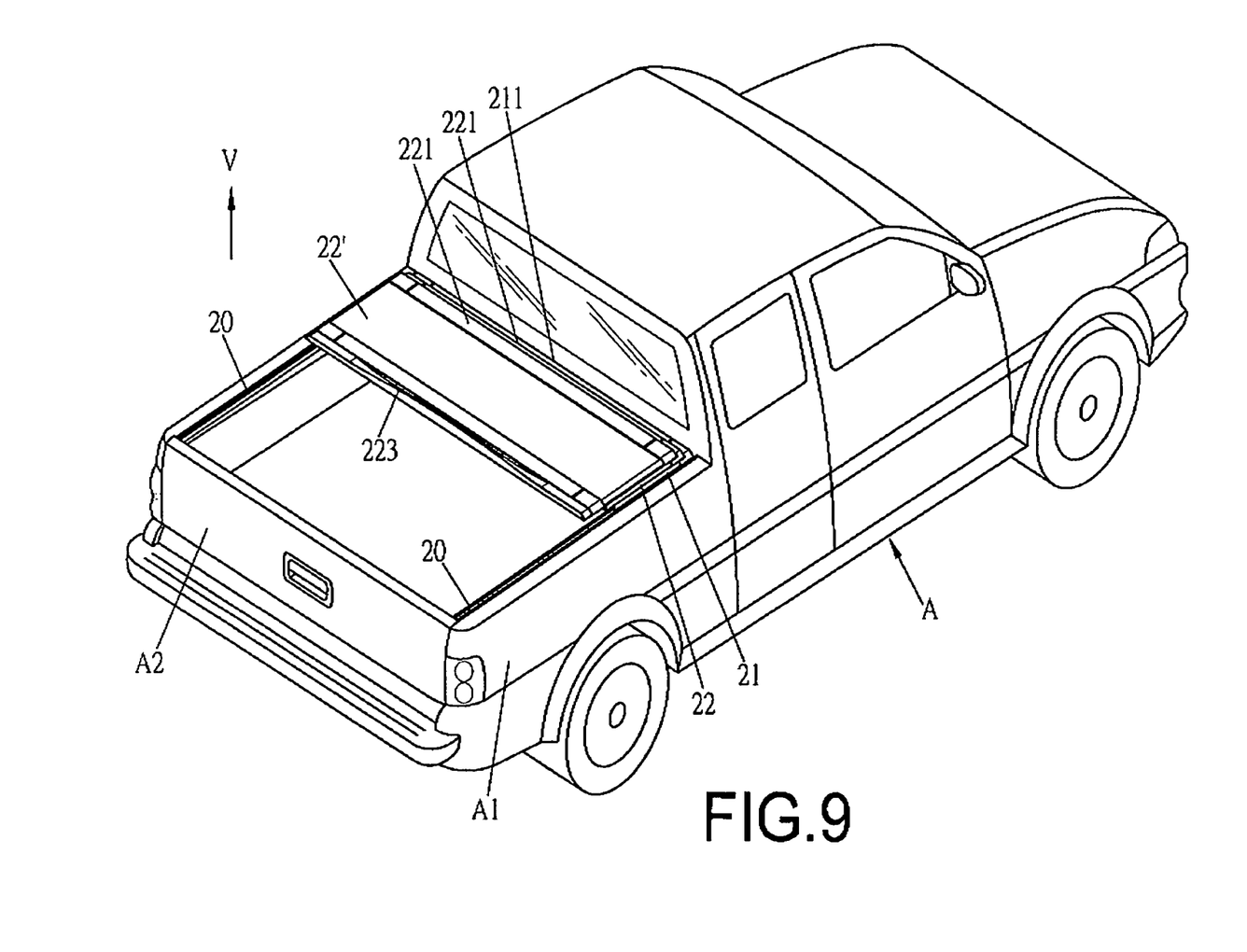
FIG. 9 is a perspective view of the tonneau cover installed at the truck and shortened to uncover the cargo bed of the truck.
Figure 10:
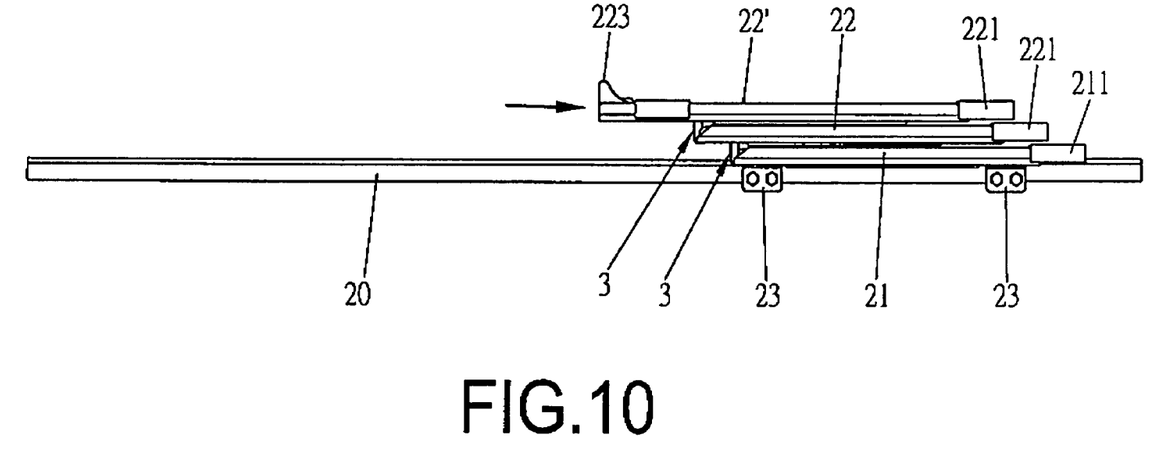
FIG. 10 is a side plan view of the tonneau cover which is completely shortened.
Figure 11:
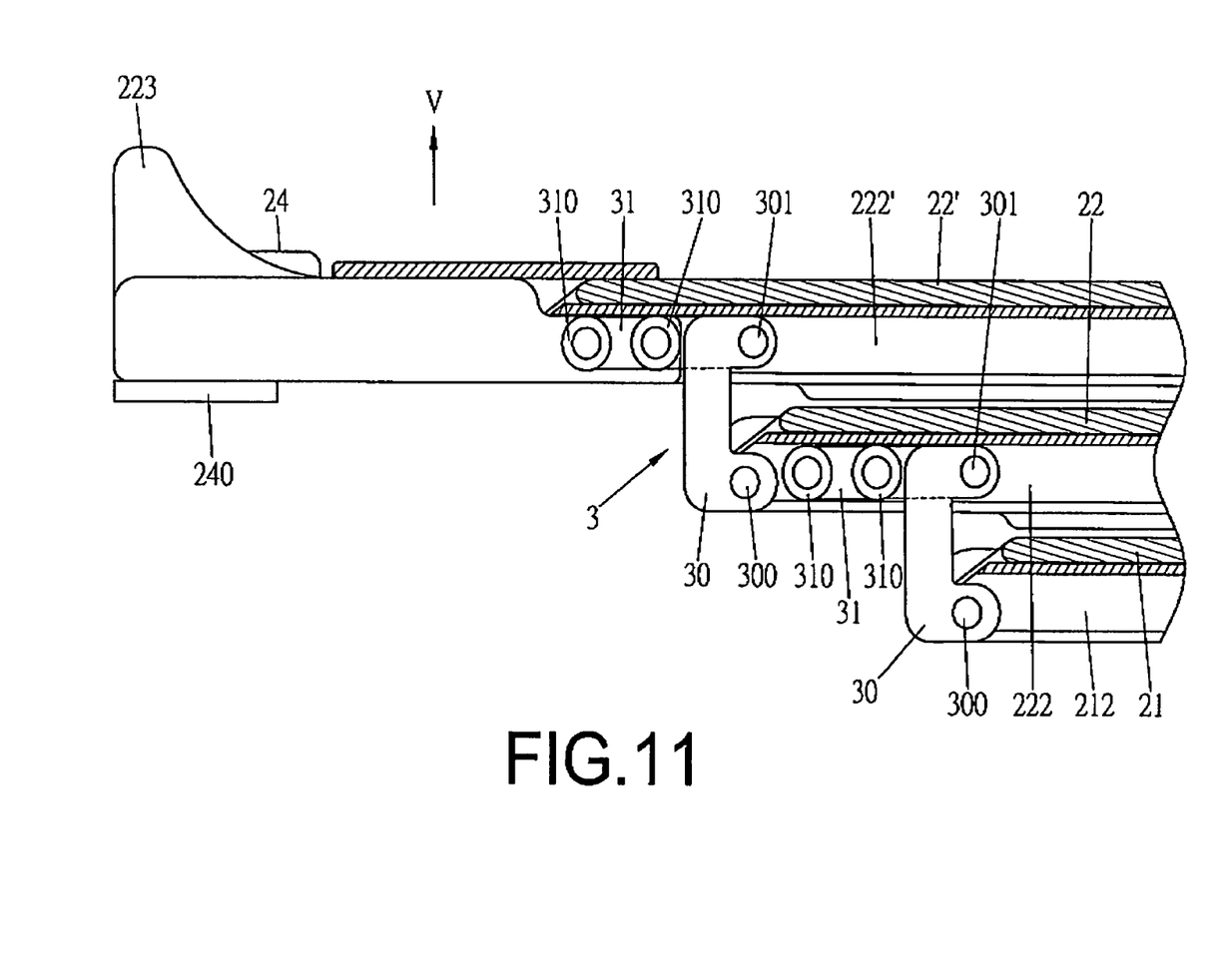
FIG. 11 is an enlarged cross sectional view of the pivotal device when the tonneau cover is shortened.
Figure 12:
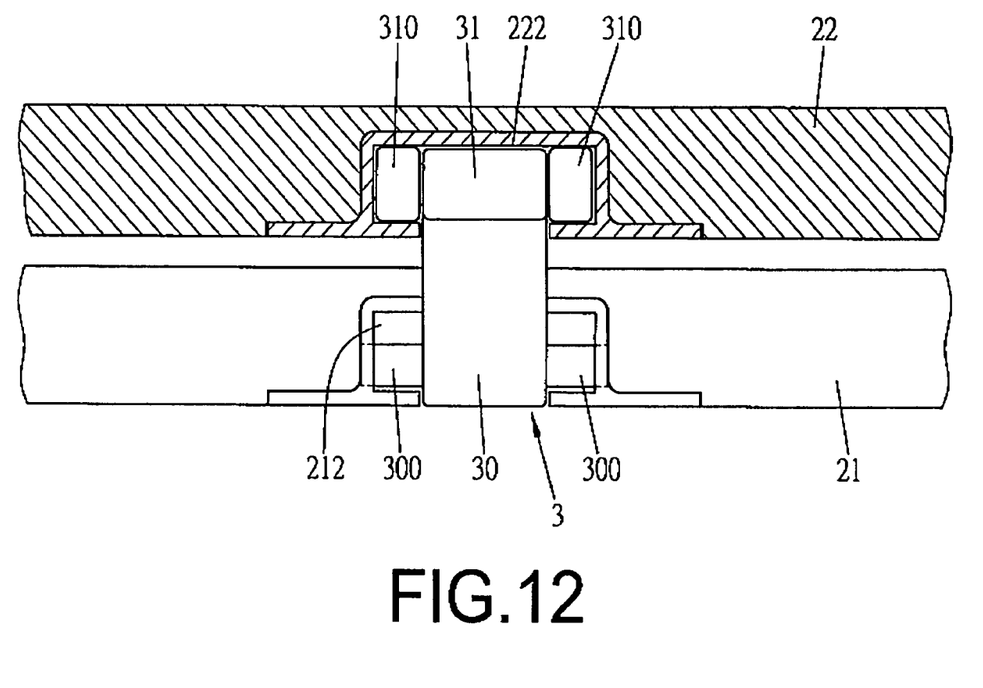
FIG. 12 shows another enlarged cross sectional view of the pivotal device when the tonneau cover is shortened.

In use, for covering the cargo bed (A1) of the truck (A), the second and third plates 22, 22' can be moved backwardly, along the two rails 20, through the rollers 310 of the pivotal devices 3 moving along the corresponding grooves 222, 222' of the second and third plates 22, 22' to have the second and third plates 22, 22' flush with the first plate 21. The lock 24 on the third plate 22' is hooked to the tailgate (A2) of the cargo bed (A1) of the truck (A) so that the second and third plates 22, 22' can be fixed to keep the tonneau cover completely extended and thus the cargo bed (A1) of the truck (A) can be covered completely (see FIG. 8). Therefore, there will be no turbulence generated when the truck (A) is moving and the goods under the tonneau cover are protected from rain and dust. For uncovering the cargo bed (A1) of the truck (A), as shown in FIG. 9, the lock 24 is unlocked by releasing the hook 240 from the tailgate (A2) of the cargo bed (A1) of the truck (A), the user then pushes the second and third plates 22, 22' along the rails 20 in the direction of the front side of the first plate 21. By the guidance of the inclined faces 210, 220 and 220', the first link 30 of the pivotal device 3 connected between the second and third plates 22, 22' can be easily turned about the second plate 22 at the second pivot 300, and the second link 31 can be pivotally moved relative to the associated first link 30, such that the first link 30 is perpendicular to the second plate 22, and thus the third plate 22' is positioned at a level, in a vertical direction (V) of the truck (A), higher than and in parallel with the second plate 22 (see FIG. 11); similarly, the first link 30 of the pivotal device 3 connected between the first and second plates 21, 22 can be easily turned about the first plate 21 at the second pivot 300, and the second link 31 can be pivotally moved relative to the associated first link 30, such that the first link 30 is perpendicular to the first plate 21, and thus the second plate 22 is positioned at a level, in a vertical direction (V) of the truck (A), higher than and in parallel with the first plate 21. Consequently, the third plate 22' can be moved forwardly to overlap the second plate 22, and the second plate 22 can be moved forwardly to overlap the first plate 21 (see also FIG. 11). Therefore, the cargo bed (A1) is unobstructed for convenience of loading and unloading. Besides, tonneau cover does not occupy too much room. The users simply push the second and third plates 22, 22' toward the first plate 21 to have the plates overlap each other. The cargo bed (A1) can be easily covered with the tonneau cover of the present invention by sliding the second and third plates 22 away from the first plate 21. The operation of the tonneau cover of the present invention is easy and convenient.

Figure 13:
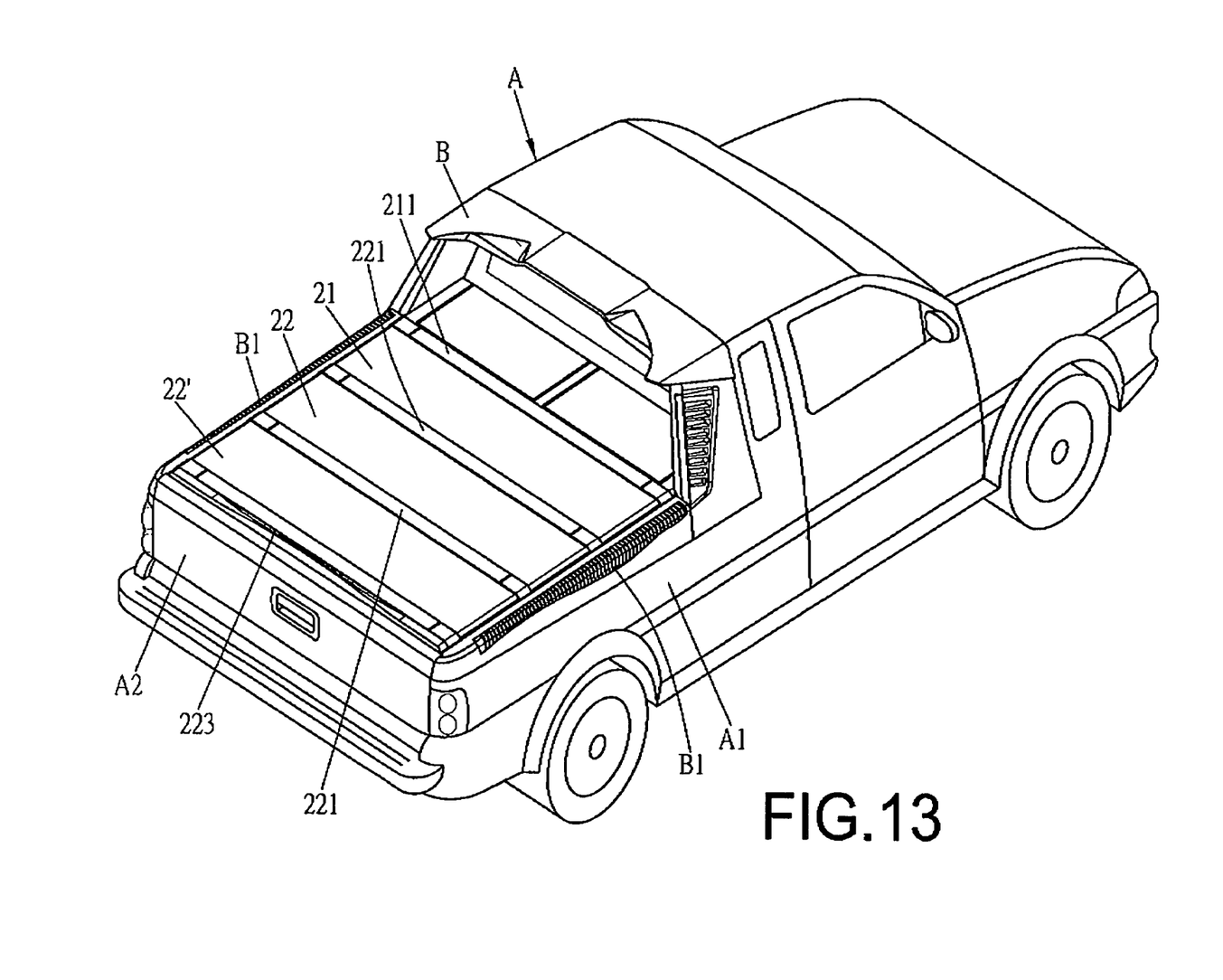
FIG. 13 shows a perspective view of the tonneau cover being installed at a truck provided with a sunshade and two rails.

The tonneau cover of the present invention can be installed to different types of trucks. As shown in FIG. 13, a truck provided with a sunshade (B) and two rails (B1) can also be installed with the tonneau cover of the present invention.

While we have shown and described the embodiment in accordance with the present invention, it should be clear to those skilled in the art that further embodiments may be made without departing from the scope of the present invention.

What is claimed is:

1. A tonneau cover, comprising:
   two rails adapted to be fixedly mounted at two lateral sides of a cargo bed of a truck;
   a first plate having two lateral sides, a front side, and a rear side, the two lateral sides of the first plate being fixed to the two rails; and
   a second plate having a front side and a rear side and defining at least one groove at an under surface thereof and arranged over the two rails and coupled to the first plate by at least one pivotal device including a first link and a second link provided with rollers and connected at a first pivot to the first link, wherein the first link is connected at a second pivot to the rear side of the first plate, and the rollers of the second link are located in the groove of the second plate;
   whereby the first link of the pivotal device is capable of being turned about the first plate at the second pivot, and the second link of the pivotal device is capable of being pivotally moved relative to the first link of the pivotal device, such that the second plate is positioned at a level, in a vertical direction of the truck, higher than and in parallel with the first plate, so that the second plate is allowed to be moved forwardly or backwardly, along the two rails, through the rollers of the pivotal device moving along the groove of the second plate, so that the second plate overlaps the first plate to uncover the cargo bed of the truck or the second plate is positioned flush with the first plate to cover the cargo bed of the truck.

2. The tonneau cover as claimed in claim 1, wherein the first link of the pivotal device is a U-shaped member, the first plate is formed with an inclined face at its rear side, and the second plate is formed with an inclined face at its front side, so as to facilitate operation of the tonneau cover.

3. The tonneau cover as claimed in claim 2, wherein the second plate is provided at its rear side with a hook for attaching the second plate to a tailgate of the cargo bed of the truck.

4. The tonneau cover as claimed in claim 3, wherein a decorative plate is provided between the first and second plates so as to cover a gap therebetween when the second plate is flush with the first plate.

5. The tonneau cover as claimed in claim 1, further comprising a third plate having a front side and a rear side and defining at least one groove at an undersurface thereof and arranged over the two rails and coupled to the second plate by at least one pivotal device including a first link and a second link provided with rollers and connected at a first pivot to the first link, wherein the first link of the pivotal device connected between the second and third plates is connected at a second pivot to the rear side of the second plate, and the rollers of the second link of the pivotal device connected between the second and third plates are located in the groove of the third plate;
   whereby the first link of the pivotal device connected between the second and third plates is capable of being turned about the second plate at the second pivot, and the second link of the pivotal device connected between the second and third plates is capable of being pivotally moved relative to the associated first link, such that the third plate is positioned at a level, in a vertical direction of the truck, higher than and in parallel with the second plate, so that the third plate is allowed to be moved forwardly or backwardly, along the two rails, through the rollers of the associated pivotal device moving along the groove of the third plate, so that the third plate overlaps the second plate to uncover the cargo bed of the truck, or the third plate is positioned flush with the second plate to cover the cargo bed of the truck.

6. The tonneau cover as claimed in claim 5, wherein the first link of each of the pivotal devices is a U-shaped member, the first plate is formed with an inclined face at its rear side, the second plate is formed with two inclined faces respectively at its front and rear sides, and the third plate is formed with an inclined face at its front side, so as to facilitate operation of the tonneau cover.

7. The tonneau cover as claimed in claim 6, wherein the third plate is provided at its rear side with a hook for attaching the third plate to a tailgate of the cargo bed of the truck.

8. The tonneau cover as claimed in claim 7, wherein a decorative plate is provided between the first and second plates so as to cover a gap therebetween when the second plate is flush with the first plate; another decorative plate is provided between the second and third plates so as to cover a gap therebetween when the third plate is flush with the second plate.

* * * * *